US011067027B2

(12) United States Patent
Nose et al.

(10) Patent No.: US 11,067,027 B2
(45) Date of Patent: Jul. 20, 2021

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Yuki Nose, Kasugai (JP); Yuto Ikeda, Toyota (JP); Yoshiyuki Shogenji, Toyota (JP); Hirokazu Ando, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 16/530,033

(22) Filed: Aug. 2, 2019

(65) Prior Publication Data
US 2020/0049096 A1   Feb. 13, 2020

(30) Foreign Application Priority Data

Aug. 7, 2018 (JP) .............................. JP2018-148061

(51) Int. Cl.
| | |
|---|---|
| *F01N 3/10* | (2006.01) |
| *F02D 41/30* | (2006.01) |
| *F02D 41/02* | (2006.01) |
| *F01N 3/035* | (2006.01) |
| *F01N 3/025* | (2006.01) |
| *F01N 9/00* | (2006.01) |

(Continued)

(52) U.S. Cl.
CPC ......... *F02D 41/3094* (2013.01); *F01N 3/023* (2013.01); *F01N 3/0253* (2013.01); *F01N 3/035* (2013.01); *F01N 3/101* (2013.01); *F01N 9/002* (2013.01); *F02D 41/025* (2013.01); *F02D 41/029* (2013.01); *F02D 41/123* (2013.01); *F02D 2200/0802* (2013.01)

(58) Field of Classification Search
CPC .. F02D 41/3094; F02D 41/025; F02D 41/029; F02D 2200/0802; F02D 41/123; F01N 9/002; F01N 3/023; F01N 3/101; F01N 3/035; F01N 3/0253
See application file for complete search history.

(56) References Cited

U.S. PATENT DOCUMENTS

| | | | | |
|---|---|---|---|---|
| 2011/0072783 | A1* | 3/2011 | Hepburn | F01N 3/023 60/274 |
| 2011/0072788 | A1* | 3/2011 | Ruona | F01N 9/00 60/276 |

(Continued)

FOREIGN PATENT DOCUMENTS

JP   2012-122438 A   6/2012

*Primary Examiner* — Matthew T Largi
(74) *Attorney, Agent, or Firm* — Oliff PLC

(57) ABSTRACT

A controller for an internal combustion engine is configured to control the internal combustion engine. The internal combustion engine includes an in-cylinder injection valve, an ignition device, an exhaust passage, and a three-way catalyst. The controller includes a fuel introduction processor configured to execute a fuel introduction process of introducing air-fuel mixture of fuel and air, which has been introduced into a cylinder, into the exhaust passage without burning the air-fuel mixture in the cylinder. The fuel introduction processor is configured to execute the fuel introduction process in a state in which only a port injection valve of the in-cylinder injection valve and the port injection valve performs fuel injection.

3 Claims, 2 Drawing Sheets

(51) Int. Cl.
  *F01N 3/023* (2006.01)
  *F02D 41/12* (2006.01)

(56) References Cited

U.S. PATENT DOCUMENTS

| | | | |
|---|---|---|---|
| 2011/0120090 A1* | 5/2011 | Sorensen, Jr. | F01N 3/22 60/274 |
| 2012/0124995 A1* | 5/2012 | Springer | F01N 9/00 60/605.1 |
| 2013/0091828 A1* | 4/2013 | In | F01N 3/101 60/274 |
| 2014/0041362 A1 | 2/2014 | Ulrey et al. | |
| 2014/0331653 A1* | 11/2014 | Irisawa | F02D 41/3023 60/286 |
| 2020/0248604 A1* | 8/2020 | Joo | F01N 3/2066 |

* cited by examiner

CONTROLLER AND CONTROL METHOD FOR INTERNAL COMBUSTION ENGINE

1. FIELD

The following description relates to a controller and a control method for an internal combustion engine in which a three-way catalyst device is arranged in an exhaust passage.

2. DESCRIPTION OF RELATED ART

U.S. Patent Application Publication No. 2014/0041362 discloses an internal combustion engine of an in-cylinder injection type including a three-way catalyst device arranged in an exhaust passage, a particulate-capturing filter arranged at the downstream side of the three-way catalyst device in the exhaust passage, and an in-cylinder injection valve that injects fuel into a cylinder. In such an internal combustion engine, particulates generated in the cylinder are captured by the filter to restrict the particulates from being released to the outside. The captured particulates gradually deposit in the filter. Thus, if the deposit is left, the deposited particulates may eventually clog the filter.

The internal combustion engine executes a fuel introduction process of increasing the temperature of the three-way catalyst device while the vehicle is coasting, thereby burning and removing the particulates deposited in the filter. In the fuel introduction process, fuel injection is executed by the in-cylinder injection valve with the spark of the ignition plug stopped. This introduces the air-fuel mixture into the exhaust passage without burning the air-fuel mixture in the cylinder. The unburned air-fuel mixture introduced into the exhaust passage flows into the three-way catalyst device and burns in the three-way catalyst device. When the heat generated by the combustion increases the temperature of the three-way catalyst device, the temperature of the gas flowing out of the three-way catalyst and into the filter increases. When the heat of the high-temperature gas increases the temperature of the filter to the ignition point of the particulates, the particulates deposited in the filter are burned and removed.

There is a known internal combustion engine in which a dual injection mode is employed as a fuel injection mode. In the dual injection mode, fuel injection is performed with two types of fuel injection valves, namely, a port injection valve that injects fuel into the intake port and a direct injection valve that injects fuel into the cylinder. Although the above-described document discloses how the fuel introduction process is executed in the internal combustion engine of the in-cylinder injection type, there has been no detailed proposal for how the fuel introduction process is executed in the internal combustion engine of the dual injection mode.

SUMMARY

A first aspect provides a controller configured to control an internal combustion engine. The controller includes an in-cylinder injection valve that injects fuel into a cylinder, a port injection valve that injects fuel into an intake port, an ignition device that ignites, by a spark, an air-fuel mixture of fuel and air introduced into the cylinder, an exhaust passage through which gas discharged out of the cylinder flows, and a three-way catalyst device provided in the exhaust passage. The controller includes a fuel introduction processor configured to execute a fuel introduction process of introducing the air-fuel mixture, which has been introduced into the cylinder, into the exhaust passage without burning the air-fuel mixture in the cylinder. The fuel introduction processor is configured to execute the fuel introduction process in a state in which only the port injection valve of the in-cylinder injection valve and the port injection valve performs fuel injection.

When the fuel introduction process is performed to introduce unburned air-fuel mixture into the exhaust passage, the unburned air-fuel mixture flows into the three-way catalyst device and burns in the three-way catalyst device. The heat generated through the combustion increases the temperature of the three-way catalyst device, that is, the catalyst temperature. As the fuel injection amount increases, the catalyst temperature may increase excessively. The fuel injection amount, which can appropriately increase the catalyst temperature within a range in which the temperature does not increase excessively (hereinafter referred to as appropriate injection amount), becomes smaller as the intake air amount becomes smaller and as the engine rotational speed becomes higher.

The fuel injection amount for a single injection of the fuel injection valve includes a lower limit amount, that is, a minimum injection amount. When the appropriate injection amount is less than the minimum injection amount, an increase in the catalyst temperature cannot remain in an appropriate range. The in-cylinder injection valve has a high fuel injection pressure to inject fuel into the cylinder, which receives compression of the piston and has a high pressure. The minimum injection amount of the in-cylinder injection valve is larger than that of the port injection valve. Thus, the appropriate injection amount tends to become less than the minimum injection amount when the fuel injection in the fuel introduction process is performed by the in-cylinder injection valve than when the fuel injection in the fuel introduction process is performed by the port injection valve. In the controller for the internal combustion engine, the fuel introduction processor executes the fuel introduction process in a state in which only the port injection valve of the in-cylinder injection valve and the port injection valve performs fuel injection. Accordingly, in the internal combustion engine including two types of fuel injection valves, namely, the port injection valve and the in-cylinder injection valve, an exhaust gas introduction process can be executed to introduce air-fuel mixture into the exhaust passage without burning the air-fuel mixture in the cylinder.

A second aspect provides a method for controlling an internal combustion engine. The internal combustion engine includes an in-cylinder injection valve that injects fuel into a cylinder, a port injection valve that injects fuel into an intake port, an ignition device that ignites, by a spark, an air-fuel mixture of fuel and air introduced into the cylinder, an exhaust passage through which gas discharged out of the cylinder flows, and a three-way catalyst device provided in the exhaust passage. The method includes executing a fuel introduction process of introducing the air-fuel mixture, which has been introduced into the cylinder, into the exhaust passage without burning the air-fuel mixture in the cylinder. The fuel introduction process is executed in a state in which only the port injection valve of the in-cylinder injection valve and the port injection valve performs fuel injection.

A third aspect provides a controller configured to control an internal combustion engine. The internal combustion engine includes an in-cylinder injection valve that injects fuel into a cylinder, a port injection valve that injects fuel into an intake port, an ignition device that ignites, by a spark, an air-fuel mixture of fuel and air introduced into the cylinder, an exhaust passage through which gas discharged out of the cylinder flows, and a three-way catalyst device provided in the exhaust passage. The controller includes processing circuitry configured to execute a fuel introduction process of introducing the air-fuel mixture, which has been introduced into the cylinder, into the exhaust passage without burning the air-fuel mixture in the cylinder. The processing circuitry is configured to execute the fuel introduction process in a state in which only the port injection valve of the in-cylinder injection valve and the port injection valve performs fuel injection.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller for an internal combustion engine 10 according to an embodiment will now be described in detail with reference to FIGS. 1 to 3.

Figure 1:
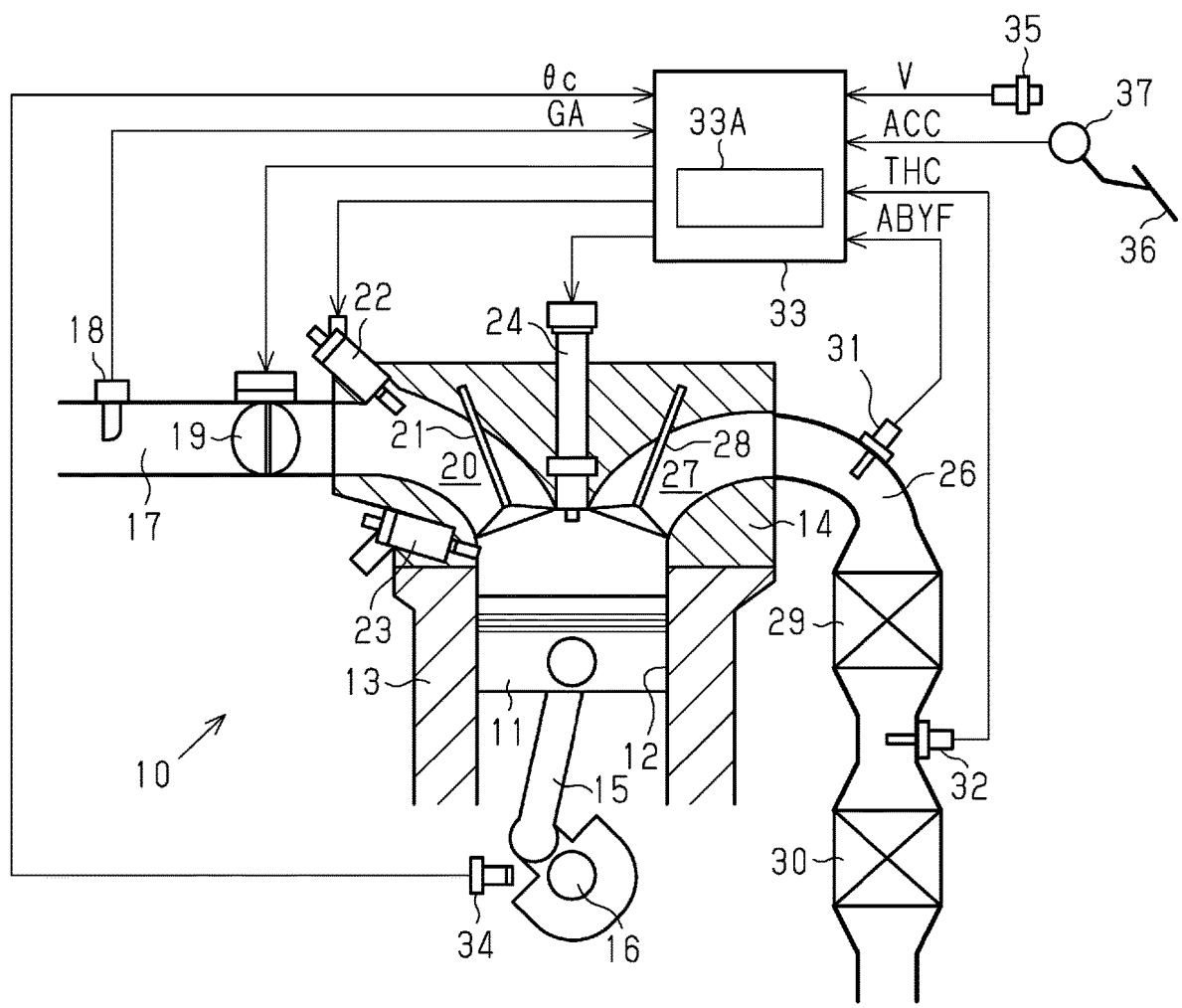
FIG. 1 is a schematic diagram showing the structure of a controller for an internal combustion engine according to an embodiment.

As shown in FIG. 1, the internal combustion engine 10 includes a cylinder block 13 with a cylinder 12, which accommodates a piston 11. The internal combustion engine 10 also includes a cylinder head 14, which is fixed to the cylinder block 13. The piston 11 is coupled to a crankshaft 16 via a connecting rod 15. The connecting rod 15 and the crankshaft 16 configure a crank mechanism that converts reciprocating motion of the piston 11 in the cylinder 12 into rotational motion of the crankshaft 16.

The cylinder 12 is connected to an intake passage 17, through which air is introduced into the cylinder 12, and an exhaust passage 26, through which exhaust gas generated through combustion in the cylinder 12 is discharged. The cylinder head 14 includes an intake port 20, which serves as a portion of the intake passage 17 connecting to the cylinder 12, and an exhaust port 27, which serves as a portion of the exhaust passage 26 connecting to the cylinder 12. The cylinder head 14 also includes an intake valve 21, which selectively opens and closes the cylinder 12 relative to the intake port 20, and an exhaust valve 28, which selectively opens and closes the cylinder 12 relative to the exhaust port 27. The cylinder head 14 further includes a port injection valve 22, which injects fuel into the intake port 20, and an in-cylinder injection valve 23, which injects fuel into the cylinder 12. In addition, the cylinder head 14 includes an ignition device 24, which ignites, by a spark, air-fuel mixture introduced into the cylinder 12.

The intake passage 17 is provided with an airflow meter 18, which detects the flow rate of the air flowing through the intake passage 17 (intake air amount GA). A throttle valve 19, which adjusts the intake air amount GA, is provided in the intake passage 17 at the downstream side of the airflow meter 18. The exhaust passage 26 is provided with a three-way catalyst device 29, which oxidizes CO and HC in the exhaust gas and reduces NOx. A filter 30 for trapping particulates is provided in the exhaust passage 26 at the downstream side of the three-way catalyst device 29. An air-fuel ratio sensor 31 is provided at the upstream side of the three-way catalyst 29 in the exhaust passage 26 to detect the oxygen concentration of the gas flowing through the exhaust passage 26, that is, an air-fuel ratio ABYF of the air-fuel mixture. Further, a catalyst outflow gas temperature sensor 32 is provided between the three-way catalyst device 29 and the filter 30 in the exhaust passage 26 to detect a catalyst outflow gas temperature THC, which is the temperature of gas flowing out of the three-way catalyst device 29.

The engine 10 includes a controller 33, which is configured as a microcomputer including a calculation processing circuit that executes calculation processes for control and a memory that stores programs and data for control. The controller 33 receives detection signals from the airflow meter 18, the air-fuel ratio sensor 31, and the catalyst outflow gas temperature sensor 32. Further, the controller 33 receives detection signals from a crank angle sensor 34, which detects a crank angle θc, or the rotation angle of the crankshaft 16, a vehicle speed sensor 35, which detects a vehicle speed V, or the travelling speed of the vehicle, and an accelerator position sensor 37, which detects an accelerator operation amount ACC, or the operation amount of an accelerator pedal 36. Based on the detection results of the sensors 34 to 37, the controller 33 controls parameters such as the opening degree of the throttle valve 19, the amounts and timings of the fuel injection of the port injection valve 22 and the in-cylinder injection valve 23, the timing of the spark of the ignition device 24 (ignition timing), and the like, thereby controlling the operating state of the internal combustion engine 10 in accordance with the driving situation of the vehicle. The controller 33 calculates the rotational speed of the internal combustion engine 10 (engine rotational speed NE) from the detection result of the crank angle θc.

During the combustion operation of the internal combustion engine 10, the controller 33 executes a fuel injection control by selecting the injection mode from a port injection mode, an in-cylinder injection mode, and an injection distribution mode in accordance with the operating situation of the internal combustion engine 10 (parameter such as engine rotational speed NE and intake air amount GA). In the port injection mode, a requested amount of fuel is all injected by the port injection valve 22. In the in-cylinder injection mode, the requested amount of fuel is all injected by the in-cylinder injection valve 23. In the injection distribution mode, some of the requested amount of fuel is injected by the port injection valve 22 and the remaining amount of fuel is injected by the in-cylinder injection valve 23.

The controller 33 further includes a fuel introduction processor 33A, which executes a fuel introduction process to increase the temperature of the three-way catalyst device 29, which is arranged in the exhaust passage 26. The fuel introduction processor 33A serves as processing circuitry. The fuel introduction processor 33A is configured to execute the fuel introduction process by executing fuel injection with the spark of the ignition device 24 stopped. In the present embodiment, the fuel introduction processor 33A executes the fuel introduction process for the purpose of preventing clogging of the filter 30.

Figure 2:
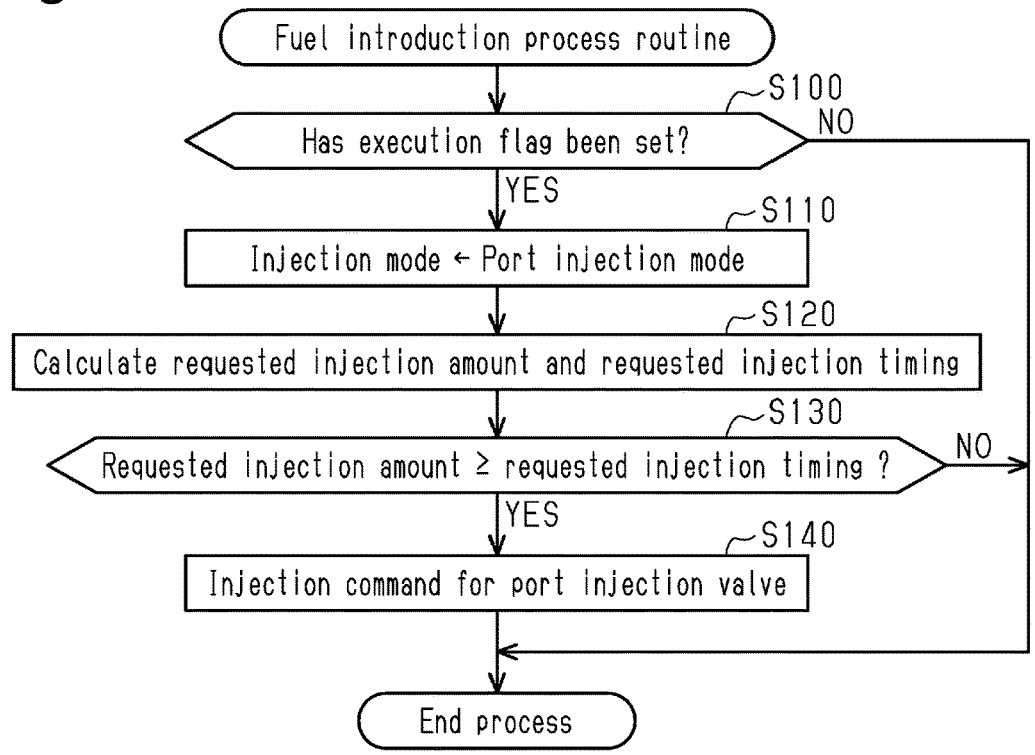
FIG. 2 is a flowchart illustrating a fuel introduction process routine executed by a fuel introduction processor provided in the controller.

FIG. 2 is a flowchart illustrating a fuel introduction process routine of executing the fuel introduction process. This routine is repeatedly executed by the fuel introduction processor 33A in a preset control cycle while the controller 33 is active.

When the routine is started, the fuel introduction processor 33A first determines in step S100 whether an execution flag for the fuel introduction process has been set. When the execution flag for the fuel introduction process is cleared (NO), the processes of the current routine are ended. When the execution flag is cleared (YES), the process is advanced to step S110. The execution flag for the fuel introduction process indicates that the condition of executing the fuel introduction process is satisfied when the flag is set and indicates that the condition is not satisfied when the flag is cleared. In the present embodiment, the condition for executing the fuel introduction process is set such that the executing condition is satisfied when the following conditions (1) to (3) are all satisfied.

(1) A fuel cut-off execution flag has been set. The fuel cut-off execution flag indicates that the condition of stopping fuel injection and spark (ignition) of the internal combustion engine 10, that is, the condition of executing a deceleration fuel cut-off, is satisfied while the vehicle is coasting. More specifically, the fuel cut-off execution flag is set when the accelerator operation amount ACC is 0 and the vehicle speed V is greater than or equal to a certain value. After setting the fuel cut-off execution flag, the fuel cut-off execution flag is cleared when the accelerator pedal 36 is depressed to request reacceleration of the vehicle or when the vehicle speed V becomes less than or equal to a preset restoration speed.

(2) An increase in the temperature of the three-way catalyst device 29 has been requested. As described above, in the present embodiment, the fuel introduction process is executed to increase the temperature of the three-way catalyst device 29 with the purpose of burning and removing particulates deposited in the filter 30. The controller 33 estimates the amount of particulates deposited in the filter 30 from the operating state of the internal combustion engine 10. The controller 33 requests a temperature increase of the three-way catalyst device 29 when the estimated amount exceeds a certain value.

(3) Burned gas has been scavenged from the exhaust passage 26. Immediately after combustion in the internal combustion engine 10 is stopped, burned gas remains in the exhaust passage 26. In the present embodiment, the fuel introduction process is started after the burned gas in the exhaust passage 26 is replaced with air. More specifically, it is determined that the burned gas has been scavenged when the deceleration fuel cut-off continues for a certain period of time or longer.

When the execution flag for the fuel introduction process is set (S100: YES), the process is advanced to step S110. In step S110, the injection mode of the internal combustion engine 10 is set to the port injection mode. Then, in step S120, a requested injection amount and a requested injection timing of the port injection valve 22 are calculated.

When calculating the requested injection amount of the port injection valve 22, the fuel introduction processor 33A first determines a catalyst fuel supply amount, which is the amount of fuel supplied into the three-way catalyst device 29 per unit of time, based on the intake air amount GA. During the fuel introduction process, the three-way catalyst device 29 receives the heat generated from the combustion of fuel in the three-way catalyst device 29, and the heat is taken away from the three-way catalyst device 29 by gas passing through the three-way catalyst device 29. As the catalyst fuel supply amount increases, the amount of the received heat increases. As the flow rate of the gas passing through the three-way catalyst device 29 increases, the amount of the heat to be taken away increases. During the fuel introduction process, in which combustion is not performed in the cylinder 12, the flow rate of the gas passing through the three-way catalyst device 29 is approximately equal to the intake air amount GA. Thus, when the catalyst fuel supply amount is the same, the catalyst temperature increases more easily when the intake air amount GA is small than when the intake air amount GA is large. In the present embodiment, the catalyst fuel supply amount is determined such that the catalyst fuel supply amount is smaller when the intake air amount GA is small than when the intake air amount GA is large. Subsequently, the fuel introduction processor 33A calculates, as the value of the requested injection amount, the injection amount of the port injection valve 22 for each injection necessary for fuel supply corresponding to the catalyst fuel supply amount based on the catalyst fuel supply amount and the engine rotational speed NE. That is, the number of times fuel injection has been performed per unit of time of the internal combustion engine 10 is obtained from the engine rotational speed NE, and the quotient obtained by dividing the catalyst fuel supply amount by the number of times of the fuel injection is calculated as the value of the requested injection amount.

Further, the fuel introduction processor 33A sets the requested injection timing of the port injection valve 22 as follows. When fuel injection is performed by the port injection valve 22 in the port injection mode or the injection distribution mode during the combustion operation of the internal combustion engine 10, the controller 33 sets the injection timing of the port injection valve 22 such that the fuel injection starts before the intake valve 21 opens. This prolongs the time from injection to combustion in the cylinder 12, expediting evaporation of the injected fuel. The fuel introduction processor 33A sets the injection timing of the port injection valve 22 during the fuel introduction process such that the fuel injection starts after the intake valve 21 opens. The reason for this is as follows. During the fuel introduction process, combustion in the cylinder 12 is not performed, and fuel simply needs to be evaporated before flowing into the three-way catalyst device 29. Some of the fuel injected by the port injection valve 22 collects on the wall surface of the intake port 20 and the intake valve 21. The collection amount of fuel is smaller when fuel injection is performed during a period in which intake air flows through the intake port 20 than when fuel injection is performed during a period in which the flow of intake air in the intake port 20 is sluggish while the intake valve 21 is closed. Thus, in the present embodiment, fuel collection is limited by setting, as the requested injection timing, a timing at which air currents flowing into the cylinder 12 from the intake port 20 are strong after the intake valve 21 closes.

Subsequently, in step S130, the fuel introduction processor 33A determines whether the requested injection amount is greater than or equal to a minimum injection amount of the port injection valve 22. When the requested injection amount is greater than or equal to the minimum injection amount (S130: YES), a command is issued for the port injection valve 22 to perform fuel injection in accordance with the calculation results of the requested injection amount and the requested injection timing in step S140. Then, the processes of the current routine are ended. When the requested injection amount is less than the minimum injection amount (S130: NO), the fuel introduction processor 33A does not issue a command to perform fuel injection. In other words, the fuel introduction processor 33A does not execute fuel injection. As a result, the processes of the current routine are ended.

If the fuel cut-off execution flag is set but the execution flag of the fuel introduction process is cleared, the controller 33 executes the deceleration fuel cut-off of the internal combustion engine 10. That is, the controller 33 stops fuel injection of the port injection valve 22 and the in-cylinder injection valve 23 and stops the spark of the ignition device 24. Thus, when the fuel cut-off execution flag is set, either the deceleration fuel cut-off or the fuel introduction process is performed. In any case, the combustion operation of the internal combustion engine 10 is stopped.

The operation and advantages of the present embodiment will now be described.

Figure 3:
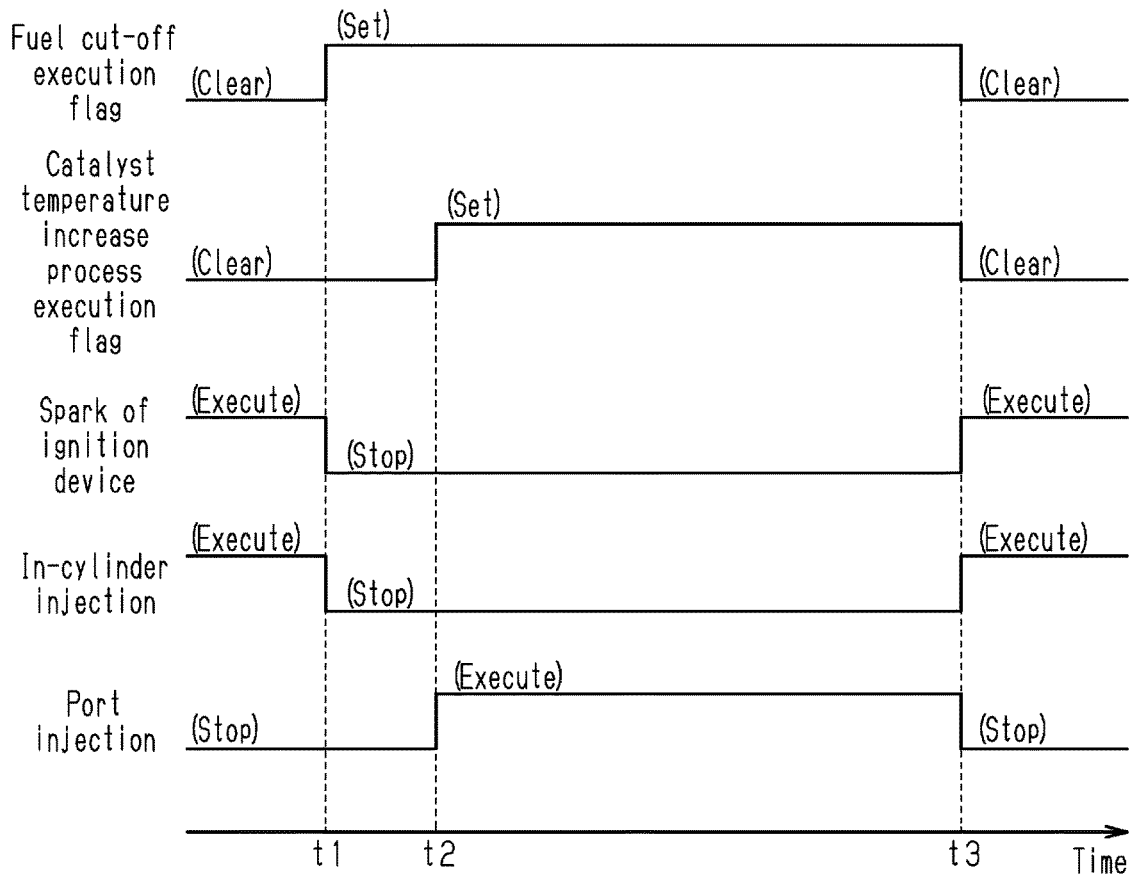
FIG. 3 is a time chart illustrating how the fuel introduction process of the fuel introduction processor is executed.

FIG. 3 shows an example of how the fuel introduction process is executed in the present embodiment. In FIG. 3, the fuel cut-off execution flag is set in the period from a point in time t1 to a point in time t3. During this period, the combustion operation of the internal combustion engine 10 is suspended. In the example of FIG. 3, the combustion operation of the internal combustion engine 10 is performed in the in-cylinder injection mode during the period prior to time t1 and during the period subsequent to time t3.

When the fuel cut-off execution flag is set at the point in time t1, the spark of the ignition device 24 and the fuel injection of the port injection valve 22 and the in-cylinder injection valve 23 are stopped, thereby starting the deceleration fuel cut-off of the internal combustion engine 10. Then, at the point in time t2, at which scavenging of the exhaust passage 26 is completed, the execution flag of the fuel introduction process is set.

If the execution flag of the fuel introduction process is set at the point in time t2, the fuel injection of the port injection valve 22 is started. The spark of the ignition device 24 remains stopped. Thus, the fuel injected by the port injection valve 22 is not burned in the cylinder 12 and is discharged unburned to the exhaust passage 26. That is, the air-fuel mixture of fuel and air introduced into the cylinder 12 is introduced unburned into the exhaust passage 26 without burning the air-fuel mixture of fuel in the cylinder 12. The unburned air-fuel mixture introduced into the exhaust passage 26 flows into the three-way catalyst device 29 and burns in the three-way catalyst device 29. The heat generated by the combustion increases the temperature of the three-way catalyst 29 (hereinafter referred to as catalyst temperature). As the catalyst temperature increases, the temperature of gas flowing out of the three-way catalyst device 29 and into the filter 30 increases. The heat of the high-temperature gas increases the temperature of the filter 30. Thus, when the temperature of the filter 30 increases to the ignition point of the particulates, the particulates deposited in the filter 30 are burned and removed.

When the fuel cut-off execution flag is cleared at the point in time t3, the execution flag of the fuel introduction process is cleared at the same time. At the point in time t3, the spark of the ignition device 24 is resumed, the fuel injection of the in-cylinder injection valve 23 is started, and the combustion operation of the internal combustion engine 10 is resumed in the in-cylinder injection mode.

As described above, the fuel introduction processor 33A of the present embodiment executes fuel injection using the port injection valve 22 during the fuel introduction process. That is, the fuel introduction processor 33A executes the fuel introduction process in a state in which only the port injection valve 22 of the in-cylinder injection valve 23 and the port injection valve 22 executes fuel injection.

During the fuel introduction process, when an excessive amount of fuel is supplied to the three-way catalyst device 29, the catalyst temperature may increase excessively. The fuel injection amount of the port injection valve 22 for a single injection cannot be less than the minimum injection amount. Thus, when the fuel injection of the port injection valve 22 is executed in a case in which the requested injection amount is less than the minimum injection amount, an excessive amount of fuel will be supplied to the three-way catalyst device 29. In the present embodiment, when the requested injection amount is less than the minimum injection amount of the port injection valve 22 (S130: NO), the fuel injection is not executed. In such a case, while the operating state (engine rotational speed NE and the intake air amount GA) of the internal combustion engine 10 is in a state in which the requested injection amount is less than the minimum injection amount of the port injection valve 22, the temperature increase of the three-way catalyst device 29 by the fuel introduction process is sluggish.

It is assumed that the fuel injection during the fuel introduction process is executed by the in-cylinder injection valve 23 instead of the port injection valve 22. The in-cylinder injection valve 23 needs to inject fuel into the cylinder 12, which has a high pressure due to compression by the piston 11. Thus, the injection pressure of fuel of the in-cylinder injection valve 23 is remarkably higher than that of the port injection valve 22. Both the port injection valve 22 and the in-cylinder injection valve 23 have a lower limit time required for a single injection (minimum injection time). As the injection pressure increases, the amount of fuel injected in the fuel injection corresponding to the minimum injection time (minimum injection amount) increases. It is technically difficult to set the minimum injection time of the in-cylinder injection valve 23 to be remarkably shorter than the minimum injection time of the port injection valve 22. Thus, the minimum injection amount of the in-cylinder injection valve 23 is larger than the minimum injection amount of the port injection valve 22. Accordingly, the requested injection amount becomes less than the minimum injection amount to stop the fuel injection more frequently when the fuel injection in the fuel introduction process is performed by the in-cylinder injection valve 23 than when the fuel injection in the fuel introduction process is performed by the port injection valve 22. Thus, fuel injection by the port injection valve 22 is more advantageous than that by the in-cylinder injection valve 23 because the temperature of the three-way catalyst device 29 can be frequently increased through the fuel introduction process.

Further, when the in-cylinder injection valve 23 injects fuel, fuel collects on the injection port of the in-cylinder injection valve 23 or the surroundings thereof. During the fuel introduction process, during which combustion in the cylinder 12 is not performed, the temperature of the cylinder 12 is low. In this state, evaporation does not proceed easily in the fuel that collects on the injection port of the in-cylinder injection valve 23 or the surroundings thereof.

Thus, in some cases, when the in-cylinder injection valve 23 performs fuel injection during the fuel introduction process, the combustion operation of the internal combustion engine 10 is resumed with a large amount of fuel collecting on the injection port or the surroundings thereof. Subsequently, the collected fuel is exposed to the heat of combustion in the cylinder 12 to become deposited. This may clog the injection port of the in-cylinder injection valve 23. Thus, fuel injection in the fuel introduction process is more advantageous when the fuel injection is performed by the port injection valve 22 than when the fuel injection is performed by the in-cylinder injection valve 23 because deposition of the fuel in the injection port of the in-cylinder injection valve 23 can be limited.

The present embodiment may be modified as follows. The present embodiment and the following modifications can be combined as long as the combined modifications remain technically consistent with each other.

In the above-described embodiment, unburned air-fuel mixture is introduced into the exhaust passage 26 by performing fuel injection with the spark of the ignition device 24 stopped. The timing at which the spark of the ignition device 24 can ignite the air-fuel mixture in the cylinder 12 is limited to a period close to the compression top dead center. That is, there is a period in which air-fuel mixture does not burn in the cylinder 12 even if the spark is generated. Thus, the fuel introduction of introducing unburned air-fuel mixture into the exhaust passage 26 can also be executed by performing fuel injection while generating the spark of the ignition device 24 during such a period.

In the above-described embodiment, the fuel introduction process is performed for the purpose of burning and removing particulates deposited in the filter 30. Instead, the fuel introduction process may be performed to increase the temperature of the three-way catalyst device 29 for other purposes. For example, a catalyst temperature increase control may be performed for the purpose of restoring the exhaust purification performance of the three-way catalyst device 29 when the exhaust purification performance is reduced due to a decrease in the catalyst temperature.

In the above-described embodiment, the fuel introduction process is performed while the vehicle is coasting when the conditions for executing the deceleration fuel cut-off are satisfied. However, the fuel introduction process may be performed under conditions other than coasting of the vehicle as long as the rotation of crankshaft 16 can be maintained with combustion in the internal combustion engine 10 stopped. Some hybrid vehicles having a motor as a drive source in addition to an internal combustion engine are capable of rotating the crankshaft with the driving force of the motor while the combustion operation of the internal combustion engine is stopped. In such hybrid vehicles, the fuel introduction process can be performed while rotating the crankshaft with the driving force of the motor.

The controller 33 or the fuel introduction processor 33A is not limited to a device that includes a CPU and a memory and executes software processing. For example, at least part of the processes executed by the software in the above-described embodiment may be executed by hardware circuits dedicated to execution of these processes (such as ASIC). That is, the controller 33 or the fuel introduction processor 33A may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

The invention claimed is:

1. A controller configured to control an internal combustion engine, the internal combustion engine including: an in-cylinder injection valve that injects fuel into a cylinder, a port injection valve that injects fuel into an intake port, an ignition device that ignites, by a spark, an air-fuel mixture of fuel and air introduced into the cylinder, an exhaust passage through which gas discharged out of the cylinder flows, and a three-way catalyst device provided in the exhaust passage, the controller comprising:
a fuel introduction processor configured to:
execute a fuel introduction process of introducing the air-fuel mixture, which has been introduced into the cylinder, into the exhaust passage without burning the air-fuel mixture in the cylinder;
execute the fuel introduction process in a state in which only the port injection valve of the in-cylinder injection valve and the port injection valve performs fuel injection; and
not execute the fuel introduction process when a requested injection amount is less than a minimum injection amount of the port injection valve.

2. The controller according to claim 1, wherein the controller is configured to execute the fuel injection process when a condition in which a fuel cut-off execution flag has been set, a condition in which an increase in a temperature of the three-way catalyst device has been requested, and a condition in which burned gas has been scavenged from the exhaust passage are satisfied.

3. A method for controlling an internal combustion engine, the internal combustion engine including: an in-cylinder injection valve that injects fuel into a cylinder, a port injection valve that injects fuel into an intake port, an ignition device that ignites, by a spark, an air-fuel mixture of fuel and air introduced into the cylinder, an exhaust passage through which gas discharged out of the cylinder flows, and a three-way catalyst device provided in the exhaust passage, the method comprising:
executing a fuel introduction process of introducing the air-fuel mixture, which has been introduced into the cylinder, into the exhaust passage without burning the air-fuel mixture in the cylinder,
wherein the fuel introduction process is executed in a state in which only the port injection valve of the in-cylinder injection valve and the port injection valve performs fuel injection, and
the fuel introduction process is not executed when a requested injection amount is less than a minimum injection amount of the port injection valve.

* * * * *